United States Patent
Toulitsis et al.

(10) Patent No.: US 11,840,627 B2
(45) Date of Patent: Dec. 12, 2023

(54) PHENOLIC TRIAZINE SILICON POLYMER RESIN BLENDS

(71) Applicant: Rolls-Royce plc, London (GB)

(72) Inventors: Anastasios Toulitsis, Derby (GB); Zoe Fielden-Stewart, Derby (GB); Mayra Yadira Rivera Lopez, Derby (GB); Ian Hamerton, Derby (GB)

(73) Assignee: ROLLS-ROYCE plc, London (GB)

( * ) Notice: Subject to any disclaimer, the term of this patent is extended or adjusted under 35 U.S.C. 154(b) by 55 days.

(21) Appl. No.: 17/652,819

(22) Filed: Feb. 28, 2022

(65) Prior Publication Data

US 2022/0289965 A1    Sep. 15, 2022

(30) Foreign Application Priority Data

Mar. 12, 2021   (GB) ...................... 2103456

(51) Int. Cl.
*C08L 65/00*    (2006.01)
(52) U.S. Cl.
CPC ................................. *C08L 65/00* (2013.01)

(58) Field of Classification Search
CPC ....................................................... C08L 65/00
See application file for complete search history.

(56) References Cited

U.S. PATENT DOCUMENTS

| | | | |
|---|---|---|---|
| 8,921,492 B2 | 12/2014 | Jennrich et al. | |
| 9,902,851 B2 | 2/2018 | Takahashi et al. | |

FOREIGN PATENT DOCUMENTS

| | | | | |
|---|---|---|---|---|
| EP | 2 666 804 A1 | 11/2013 | | |
| EP | 2666804 A1 | * 11/2013 | ......... | C08G 73/0273 |
| EP | 2910587 A1 | 8/2015 | | |
| EP | 3 260 501 A1 | 12/2017 | | |

OTHER PUBLICATIONS

Jul. 26, 2022 extended Search Report issued in European Patent Application No. 22156481.8.

* cited by examiner

*Primary Examiner* — Robert D Harlan
(74) *Attorney, Agent, or Firm* — Oliff PLC

(57) ABSTRACT

A resin composition that is useful in the preparation of protective coatings. The resin composition comprises a polyfunctional cyanate ester, a phenol-end-modified PDMS oligomer, and a catalyst.

12 Claims, No Drawings

PHENOLIC TRIAZINE SILICON POLYMER RESIN BLENDS

CROSS-REFERENCE TO RELATED APPLICATIONS

This application claims priority pursuant to 35 U.S.C. 119(a) to United Kingdom Patent Application No. 2103456.6, filed Mar. 12, 2021, which application is incorporated herein by reference in its entirety.

FIELD OF THE DISCLOSURE

The present disclosure concerns resin-based compositions and blends and their use in preparing protective coatings and composite materials. More specifically it relates to phenolic triazine silicon polymer-based compositions and blends that are useful in the preparation of icephobic and/or corrosion-resistant coatings or composite materials for aerospace applications.

BACKGROUND

Certain aerospace components such as fan blades are commonly formed from advanced composite materials as they provide the necessary relative stiffness and strength whilst minimising weight thereby minimising specific fuel consumption. Such composite materials often include organic matrix resin systems.

Composite materials typically comprise organic matrices and the chemical composition of a given organic matrix typically dictates the chemical and physical properties of the composite material that are desired for its intended use.

Commercially available composite materials often comprise epoxy resin-based organic matrices. However epoxy resin-based materials typically have limited temperature ranges for safe and effective use. There is therefore a need for novel composite materials that can sustain the high temperatures for prolonged periods of times. The need is especially acute in the aerospace industry, for example in the construction of components such as the turbine blades of gas turbine engine.

Aerospace components can be worn and damaged by icing and erosion. The accretion of ice can change the aerodynamic characteristics of aerospace components and in some instances pose a risk to flight safety. Erosion can cause material loss to aerospace components and require them to be prematurely replaced to maintain safety, performance and fuel economy.

It is therefore desirable to provide improved coating compositions and protective coatings that are suitable for use in the protection and/or manufacture of aerospace components, or at least provide useful alternatives to known coating compositions and protective coatings.

SUMMARY OF THE DISCLOSURE

In a first aspect the present disclosure provides a resin composition comprising: (a) a polyfunctional cyanate ester; (b) a phenol-end-modified PDMS oligomer; and (c) a catalyst.

In a second aspect the present disclosure provides a resin blend comprising a cured resin composition of the first aspect.

In a third aspect the present disclosure provides a composite material comprising an organic matrix that comprises a resin blend of the second aspect.

In a fourth aspect the present disclosure provides a component coated with a resin blend of the second aspect or formed from a composite material of the third aspect. The component may be an aerospace component such as a gas turbine or hybrid electric engine component.

In a fifth aspect the present disclosure provides a method of preparing a resin blend of the second aspect, the method comprising the steps of: (i) mixing a polyfunctional cyanate ester, a phenol-end-modified PDMS oligomer; and a catalyst to form a resin composition of the first aspect; and (ii) curing the resin composition to form the resin blend of the second aspect.

In a sixth aspect the present disclosure provides a method of preparing a composite material of third aspect, the method comprising the steps of: forming a stack of successive layers of a resin blend of the second aspect and a reinforcing material; and curing the stack of layers to form a composite material of the third aspect.

The term "cyanate ester" as used herein means a molecule in which the hydrogen atom of a phenolic OH group has been substituted with a cyanide (–C≡N) group.

The term "polyfunctional cyanate ester" as used herein means a cyanate ester that comprises more than one cyanide groups.

The term "PDMS" as used herein means polydimethylsiloxane i.e. belonging to a group of polymeric organosilicon compounds that are commonly referred to as silicones.

The term "PDMS oligomer" as used herein means an oligomer of polydimethylsiloxane.

The term "phenol-end-modified PDMS oligomer" as used herein means a polydimethylsiloxane oligomer that has been modified to have phenol groups on each end.

Other than in the operating examples, or where otherwise indicated, all numbers expressing quantities of ingredients used herein are to be understood as modified in all instances by the term "about".

Throughout this specification and in the claims that follow, unless the context requires otherwise, the word "comprise" or variations such as "comprises" and "comprising", will be understood to imply the inclusion of a stated integer or group of integers but not the exclusion of any other stated integer or group of integers.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DETAILED DESCRIPTION OF THE DISCLOSURE

Aspects and embodiments of the present disclosure will now be discussed with reference to the accompanying drawings. Further aspects and embodiments will be apparent to those skilled in the art.

The present disclosure concerns resin-based compositions and blends and their use in preparing protective coatings and composite materials. More specifically it relates to phenolic triazine silicon polymer-based compositions and blends that are useful in the preparation of icephobic and/or corrosion-resistant coatings or composite materials for aerospace applications.

Resin compositions of the present disclosure may be cured to form resin blends which can be used as a matrix in composite materials. The present disclosure also provides components that are coated with a resin blend of the present disclosure or are formed from a composite material of the present disclosure.

Resin blends and composite materials of the present disclosure can withstand high temperatures, for example up to about 200° C. and even up to about 400° C. This makes them especially suitable for aerospace applications. Resins blends of the present disclosure are useful as environmental protective coatings e.g. applied to aerospace components, for example gas turbine and hybrid electric engine components such as fan blades. They have been found to be icephobic and erosion resistant. These useful properties are also exhibited by aerospace components that are formed composite materials of the present disclosure.

In broad terms the present disclosure provides a resin composition comprising: (a) a polyfunctional cyanate ester; (b) a phenol-end-modified PDMS oligomer; and (c) a catalyst.

Each component of this composition will now be described in turn.

Polyfunctional Cyanate Ester

The resin composition of the present disclosure includes a polyfunctional cyanate ester.

As used herein, the term "cyanate ester" refers to a molecule in which the hydrogen atom of a phenolic OH group has been substituted with a cyanide (–C≡N) group. A "polyfunctional cyanate ester" is a cyanate ester which comprises more than one cyanide groups.

Any suitable polyfunctional cyanate ester may be used. For example, the polyfunctional cyanate ester may have a glass-transition temperature equal to or greater than about 300° C., when cured. For example, the polyfunctional cyanate ester may have a glass-transition temperature equal to or greater than about 310° C., for example equal to or greater than about 320° C., for example equal to or greater than about 330° C., for example equal to or greater than about 340° C., for example equal to or greater than about 350° C., for example equal to or greater than about 360° C., for example equal to or greater than about 370° C., for example equal to or greater than about 380° C., when cured. For example, the polyfunctional cyanate ester may have a glass-transition temperature equal to or less than about 500° C., for example equal to or less than about 490° C., for example equal to or less than about 480° C., for example equal to or less than about 470° C., for example equal to or less than about 460° C., for example equal to or less than about 450° C., for example equal to or less than about 440° C., for example equal to or less than about 430° C., for example equal to or less than about 420° C., for example equal to or less than about 410° C., for example equal to or less than about 400° C., when cured. For example, the polyfunctional cyanate ester may have a glass-transition temperature ranging from about 300° C. to about 500° C. or from about 350° C. to about 450° C. or from about 380° C. to about 420° C. or from about 380° C. to about 400° C., when cured. This refers to the glass-transition temperature of the polyfunctional cyanate ester when cured alone (i.e. without the other components in the resin blend).

Glass-transition temperature may, for example, be measured by Dynamic Mechanical Analysis (DMA), for example according to ASTM D4065-12 or D5279-13.

The polyfunctional cyanate ester may, for example, be one of the polyfunctional cyanate esters disclosed in Chemistry and Technology of Cyanate Ester Resins (I Hamerton, Ed.) Blackie Academic and Professional: Glasgow, 1994, pp. 34-43, the contents of which are incorporated herein by reference.

The polyfunctional cyanate ester may, for example, be a novolac cyanate ester.

Novolacs are polymers derived from phenol derivatives and formaldehyde such that the phenolic units are linked by methylene and/or ethylene groups in the ortho and/or para positions. The phenol derivative may, for example, be phenol or methylphenol. The ratio of formaldehyde to phenol derivative may, for example, be less than one. The novolac may, for example, comprise from about 10 to about 20 phenolic units.

Novolac cyanate esters are novolacs in which one or more hydrogen atom(s) of one or more phenolic OH group(s) are substituted with a cyanide (–C≡N) group. For example, the novolac cyanate ester may be a novalac in which the hydrogen atoms of two or more phenolic OH groups have been substituted with cyanide (–C≡N) groups. For example, the novolac cyanate ester may be a novolac in which all of the hydrogen atoms of the phenolic OH groups have been substituted with cyanide (–C≡N) groups.

The polyfunctional cyanate ester may, for example, be an oligomer of formula I below:

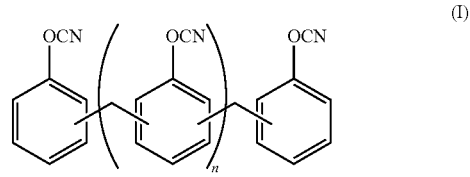

(I)

where n is 1, 2 or 3.

The polyfunctional cyanate ester of formula II may, for example, have a molecular weight ranging from about 300 g/mol to about 500 g/mol, for example from about 350 g/mol to about 450 g/mol, for example from about 360 to about 400 g/mol.

The polyfunctional cyanate ester may, for example, be the material referred to as Primaset® PT-30 supplied by Lonza Group Ltd or the material referred to as AroCy® XU-371 novalac-based cyanate ester supplied by Huntsman Advanced Materials.

Phenol-End-Modified PDMS Oligomer

The protective coating composition of the present disclosure includes a phenol-end-modified polydimethylsiloxane (PDMS) oligomer. Siloxanes have a low erosion yield that significantly retards erosion to underlying layers of material.

In some embodiments the phenol-end-modified PDMS oligomer is a polymeric organosilicon compound. Such compounds are commonly referred to as silicones.

"Phenol-end-modified" refers to the fact that the oligomer chain includes phenol groups (6 membered aromatic carbon ring with OH group) on each end. It is understood that the hydroxyl groups allow bonding of the oligomer to the cyanate ester polymer. The flexibility of the oligomer section allows an increase in toughness of the overall system, due to being able to yield upon load.

In some embodiments the phenol-end-modified PDMS oligomer is a compound of formula II:

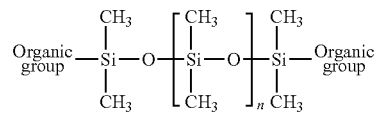

where Organic group is a phenol group:

In some embodiments the phenol-end-modified PDMS oligomer is a phenol-modified silicone fluid referred to as KF-2201 and supplied by Shin-Etsu Chemical Co., Ltd. and having the formula III:

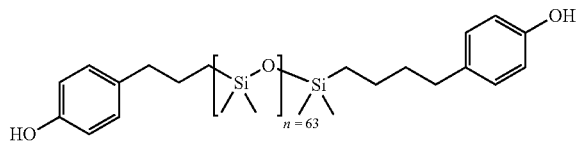

Catalyst

The catalyst is added to lower the cure initiation temperature.

The catalyst catalyses the polymerisation of the polyfunctional cyanate ester and the phenol-end-modified PDMS oligomer of the resin composition.

The catalyst can take many forms suitable for the required purpose.

In some embodiments the catalyst is $Cu^{II}(AcAc)_2$ i.e. bis(acetylacetonato)-copper(II) or copper acetylacetonate.

The catalyst may be suspended in a liquid epoxy resin, e.g. EPIKOTE™ Resin 828 epoxy resin, which is a medium viscosity liquid epoxy resin produced from bisphenol A resin and epichlorohydrin that is commercially available from Hexion Inc.

The resin composition includes the catalyst in an amount that is suitable for the purpose.

In certain embodiments the resin composition includes 100 to 1000 ppm of 1% $Cu^{II}(AcAc)_2$ in EPIKOTE™ Resin 828 epoxy resin, 200 to 500 ppm of 1% $Cu^{II}(AcAc)_2$ in EPIKOTE™ Resin 828 epoxy resin, or about 288 ppm 50 of 1% $Cu^{II}(AcAc)_2$ in EPIKOTE™ Resin 828 epoxy resin.

Resin Blend

The present disclosure also provides a resin blend that comprises a cured from of the resin composition of the present disclosure.

The curing process can be performed by any art known curing method. Such methods may include autoclaving, hot pressing or liquid moulding.

The resin composition of the present disclosure can be formulated to fine-tune one or more properties of the resin blend produced by curing the resin composition. Such properties may include, for example, the process ability/fluidity/viscosity prior to curing, thermo-mechanical properties (e.g. glass-transition temperature), thermal and thermo-oxidative stability, reactivity, and flame retardancy moisture absorption, icephobicity and/or erosion performance.

The resin blend of the present disclosure is useful for coating components, e.g. aerospace components, to protect them from environmental stresses such as icing and erosion.

The performance and integrity of aerospace components can be detrimentally affected by ice forming on them or by ice particles scraping their surfaces. While many aerospace components can be exposed to high temperatures in use, at least certain aerospace components can be exposed to ice when not in use and/or when in use. Electrical de-icing heaters can be provided to avoid or minimise aerospace components icing however they are typically energy-intensive, add complexity to aerospace sub-systems components, and increase the weight of the overall aircraft thus increasing specific fuel consumption (SFC).

The resin blend of the present disclosure can be useful as an icephobic coating i.e. a coating that can repel water droplets, delay ice nucleation and/or reduce ice adhesion. As such it can slow the build-up of ice on components coated same, facilitate ice to be shed from such components, reduce the amount of energy required to remove ice through reduction of electrical heaters required, and reduce the complexity/weight of systems otherwise used to address ice accretion.

As the resin blend of the present disclosure is cyanate ester resin-based, it is compatible with other cyanate ester resin-based composite fibre reinforced polymers commonly used in the aerospace industry.

The resin blend of the present disclosure may be used to encapsulate an electrical ice protection system. Electrically resistive materials (e.g. carbon nanotubes or carbon veils) may be embedded in the resin composition and therefore incorporated in the resin blend formed by curing that resin composition to act as electrical heating elements to actively increase the surface temperature of the aerospace component the resin blend has been coated.

Composite Material

The present disclosure also provides a composite material that comprising an organic matrix that comprises a resin blend of the present disclosure.

As used herein, a "composite material" is a material comprising two or more different materials that remain separate and distinct in the composite material, where the two or more different materials have different chemical and/or physical properties such that, when combined, produce a material that has properties different from the individual components. Thus, one component of the composite material disclosed herein is a resin blend of the present disclosure.

Another or the component of the composite material may be a reinforcing material. The reinforcing material may be any suitable material for the purpose. For example the reinforcing material glass may be glass fibres or a nanomaterial.

Composite materials are especially useful in aerospace applications as they typically offer cost and weight savings.

The present disclosure provides a method for making a composite material of the present disclosure. In broad terms the method comprises the steps of forming a stack of successive layers of a resin blend of the present disclosure and a reinforcing material; and curing the stack of layers to form the desired composite material.

The composite material may, for example, have one or more of the properties such as glass transition temperature, thermal stability and/or moisture uptake described herein in relation to the resin blend.

Any methods known to persons skilled in the art may be used to form the composite materials disclosed herein such as hot melt pre-preg methods, filament winding methods, and resin transfer molding (RTM) methods.

Component

The present disclosure also provides a component that is coated with a resin blend of the present disclosure or is formed from the composite material of the present disclosure.

The component may take many forms. In general it can be any component that may benefit from being coated with a resin blend of the present disclosure or formed from the composite material of the present disclosure.

The component may, for example, be an aerospace component such as a gas turbine or hybrid electric engine component, e.g. a fan blade.

Components of the fan area in a gas turbine can be manufactured by composite materials. Composite materials like high temperature organic matrix reinforced composites with time can absorb moisture or come in contact with jet fuel, turbine oil and salt that can reduce their performance. In addition, these materials suffer from erosion that can lead to material loss and may adversely influence the lifecycle of the structure.

Additionally, the accretion of ice can change aerodynamic characteristics, greatly affecting the flight safety.

Method of Preparing a Resin Blend

The present disclosure also provides a method of preparing the aforementioned resin blend. The method comprises the steps of: (i) mixing a polyfunctional cyanate ester, a phenol-end-modified PDMS oligomer; and a catalyst to form a resin composition of the present disclosure; and (ii) curing the resin composition to form the resin blend of the present disclosure.

Step (i) of the method involves mixing a polyfunctional cyanate ester, a phenol-end-modified PDMS oligomer; and a catalyst to form a resin composition of the present disclosure.

In that step the polyfunctional cyanate ester, the phenol-end-modified PDMS oligomer and the catalyst may be any of those described above.

The mixing can be performed by any art known mixing method.

In some embodiments the resin composition is partially cured to prevent or minimise phase separation during the curing step. For example a 1:1 wt. % ratio of polyfunctional cyanate ester: to PDMS and initially prepared and mixed at 120° C. for 40 minutes. Once mixed, remaining polyfunctional cyanate ester is added with the catalyst and stirred for another 40 minutes at 100° C. The mixture is then degassed, e.g. under vacuum at 90° C. for 30 minutes or until there are no visual bubbles in the mixture. The degassing serves to remove entrapped air before the curing step to prevent or at least minimise the formation voids in the cured product.

Step (ii) of the method involves curing the resin composition formed in step (i) to form the resin blend of the present disclosure.

In that step the curing process can be performed by any art known curing method suitable for the purpose.

For example, the curing is performed at an elevated temperature, e.g. from 80° C. to 120° C., from 90° C. to 100° C., from 95° C. to 105° C., or about 100° C. The curing is performed for a sufficient time to form the resin blend, for example for 30 to 80 minutes, for 30 to 60 minutes, for 35 to 45 minutes, or for about 40 minutes.

An additional or post curing step may be is performed to increase the thermal stability of the resin blend.

Method of Preparing a Composite Material

The present disclosure also provides a method of preparing a composite material of the present disclosure. The method comprises the steps of: (i) forming a stack of successive layers of a resin blend of the present disclosure and a reinforcing material; and (ii) curing the stack of layers to form a composite material of the present disclosure.

Step (i) of the method involves forming a stack of successive layers of a resin blend of the present disclosure and a reinforcing material. The reinforcing material may be any suitable material for the purpose. For example the reinforcing material glass may be glass fibres or a nanomaterial.

The stack may be formed by heating the resin blend and spreading it onto a first layer of release film, applying a layer of reinforcing material on top of the resin blend layer, placing a second layer of release film on top of the layer of reinforcing material to form a single pre-impregnated (prepreg) ply, and repeating these steps as necessary to obtain a desired number of prepreg plies, removing the release layers, and successively layers of resin blend and reinforcing material.

Step (ii) of the method involves curing the stack of layers to form a composite material of the present disclosure.

In that step the curing process can be performed by any art known curing method suitable for the purpose. Such methods may include autoclaving, hot pressing or liquid moulding.

EXAMPLES

The follow examples are provided to illustrate embodiments of the resin composition, resin blend, and composite material of the present disclosure.

Example 1

Preparation of a Resin Composition and its Use in the Preparation of an Icephobic/Erosion-Resistant Resin Blend A resin composition of the present disclosure comprises:
(a) 94 parts by weight PRIMASET® PT-30 polyfunctional cyanate ester (supplied by Lonza Group AG):

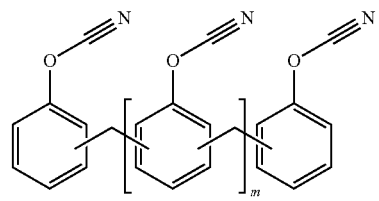

(b) 6 parts by weight of a phenol-end-modified PDMS oligomer (supplied by Shin-Etsu Chemical Co. Ltd, product code KF-2201):

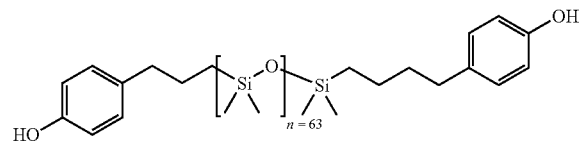

and
(c) 288 ppm of 1% $Cu^{II}(AcAc)_2$ in EPIKOTE™ Resin 828 epoxy resin as a catalyst.

Such a resin composition of the present disclosure was prepared and cured as follows to form a resin blend of the present disclosure:

Step (i): 6 parts by weight of PRIMASET® PT-30 polyfunctional cyanate ester (supplied by Lonza Group AG): and 6 parts by weight of phenol-end-modified PDMS oligomer (supplied by Shin-Etsu Chemical Co. Ltd, product code KF-2201) was mixed to form a 1:1 wt. % ratio, through stirring at 120° C. for 40 minutes. This step is performed in order to partially cure the material to prevent or minimise phase separation of the two materials during the curing step.

Step (ii): The remaining PRIMASET® PT-30 polyfunctional cyanate ester was added to the mixture to achieve a 94:6 wt. % ratio formulation. 288 ppm of 1% $Cu^{II}(AcAc)_2$ in EPIKOTE™ Resin 828 epoxy resin (supplied by Hexion Inc) was added to the mixture with stirring at 100° C. for 40 minutes.

Step (iii): The mixture was then degassed under full vacuum at 90° C. for 30 minutes in order to remove entrapped air before the curing step to prevent void formation.

Step (iv): The resin was then cured in a borosilicate glass mould using the following cure cycle: 160° C. for 1 hour and 200° C. for 1 hour, to produce a cured neat-resin sample. A higher temperature post-cure from 200 to 260° C. may be included after the second cure temperature to increase the glass transition temperature of the cure material if required.

Note: The resulting resin blend after step (iii) may be cured as neat resin, cast into a film for prepreg manufacture using fibrous reinforcement for composite manufacture or stored in a refrigerator at 3 to 5° C. for up to 7 days. Longer-term storage is possible using a freezer.

Example 2

Manufacture of a Composite Material Comprising a Glass-Fibre Reinforced Icephobic/Erosion-Resistant Resin Blend The resin blend described in Example 1 was also used to manufacture a composite material of the present disclosure. The composite material was prepared as follows:

Step (i): 16 layers of HexForce™ 7781 8 harness satin weave glass-fibre (supplied by Hexcel) were trimmed to a desired composite dimension, to ultimately form a composite of approximately 4 mm thick.

Step (ii): The resin blend described in Example 1 was heated at 90° C. to decrease the viscosity and then spread onto release film at a set weight ratio to the glass fibre layer, to ultimately produce a fibre volume fraction ($V_f$) of approximately 55%. A single glass fibre layer was then placed on top of the spread resin, followed by a second layer of release film to form a single pre-impregnated (prepreg) ply. The step was repeated with all 16 woven glass-fibre layers to form 16 prepreg plies.

Step (iii): Each prepreg ply was placed in a vacuum bag and heated at 90° C. under vacuum to decrease the resin viscosity and allow sufficient wetting of the glass fibres, to form a uniform prepreg ply.

Step (iv): The prepreg plies were taken out of the vacuum bag and placed in the fridge in order to drop the resin viscosity for better handling in the prepreg lay-up. The prepreg lay-up was completed by removing the release film sheets from each prepreg ply and stacking them on top of one another on top of an aluminium tool plate, until the stack comprised of 16 plies. The prepreg stack was then vacuum bagged and cured under vacuum in an autoclave following the cure cycle described in step (iv) of Example 1, with the addition of 6 bar gauge pressure during cure to produce a composite material of the present disclosure.

Example 3

Icephobic Characterisation of a Resin Blend—Mode I Testing

The composite material described in Example 2 was subjected to icephobic characterisation testing at the Cranfield University (CU) icing tunnel facility.

Two ice types were considered:
1. a glaze ice obtained with a tunnel total temperature of −5° C., a tunnel wind speed of 50 m/s, a cloud liquid water content (LWC) of 0.4 g/m³ and a droplet median volume diameter (MVD) of 20 μm.
2. a rime ice obtained with a tunnel total temperature of −20° C., a tunnel wind speed of 50 m/s, a cloud liquid water content (LWC) of 0.4 g/m³ and a droplet median volume diameter (MVD) of 20 μm.

For mode I testing, the described resin blend and composite material samples manufactured in Example 1 and Example 2 respectively, were machined into discs (30 mm diameter with a 4 mm hole at the centre) and glued to cylindrical platforms in the icing tunnel testing chamber. Ice was grown on the surface of the samples under the specific conditions listed above and, once at a sufficient thickness (approximately 20 mm), the force required to remove the ice through mode I crack propagation along the ice-sample interface was recorded and translated into an ice adhesion value.

The samples were tested under the two icing conditions for both the resin blend and the composite material samples, as well as neat PT-30 and a comparison material, Ti-6Al-4V.

The results are presented in Table 1 below:

TABLE 1

| Material | Glaze ice fracture energy mean (J/m²) | Rime ice fracture energy mean (J/m²) |
| --- | --- | --- |
| PT-30 | 0.480 | 0.381 |
| PT-30/PDMS neat resin blend | 0.341 | 0.254 |
| PT-30/PDMS composite material | 0.730 | 0.241 |
| Ti-6Al-4V | 0.613 | 0.696 |

It will be understood that the invention is not limited to the embodiments above-described and various modifications and improvements can be made without departing from the concepts described herein.

What we claim is:

1. A resin composition comprising:
   (a) a polyfunctional cyanate ester;
   (b) a phenol-end-modified polydimethylsiloxane (PDMS) oligomer; and
   (c) a catalyst,
   wherein the phenol-end-modified polydimethylsiloxane (PDMS) oligomer consists of only Si, O, C and H as elements.

2. The resin composition of claim 1, wherein the polyfunctional cyanate ester has a glass-transition temperature, when cured, from about 300° C. to about 500° C.

3. The resin composition of claim 2, wherein the polyfunctional cyanate ester has a glass-transition temperature, when cured, from about 380° C. to about 420° C.

4. The resin composition of claim 1, wherein the polyfunctional cyanate ester is a novolac cyanate ester.

5. The resin composition of claim 1, where the polyfunctional cyanate ester is an oligomer of formula I:

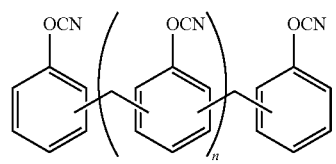

where n is 1, 2 or 3.

6. The resin composition of claim 1, wherein the polyfunctional cyanate ester has a molecular weight from about 300 g/mol to about 500 g/mol.

7. The resin composition of claim 6, wherein the polyfunctional cyanate ester has a molecular weight from about 360 to about 400 g/mol.

8. The resin composition of claim 1, wherein the phenol-end-modified PDMS oligomer is a compound of formula II:

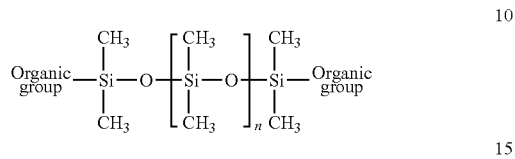

9. The resin composition of claim 1, wherein the phenol-end-modified PDMS oligomer is a compound of formula III:

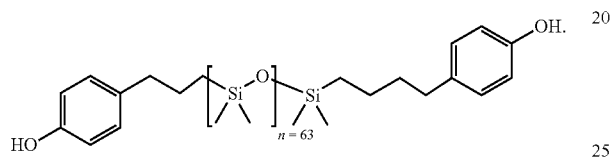

10. The resin composition of claim 1, where the catalyst is bis(acetylacetonato)copper(II).

11. A resin blend comprising a cured resin composition of claim 1.

12. A composite material comprising an organic matrix that comprises a resin blend of claim 11.

* * * * *